United States Patent
Bai et al.

(10) Patent No.: US 11,265,879 B2
(45) Date of Patent: Mar. 1, 2022

(54) GROUP COMPONENT CARRIER BASED UPDATES

(71) Applicant: QUALCOMM Incorporated, San Diego, CA (US)

(72) Inventors: Tianyang Bai, Somerville, NJ (US); Yan Zhou, San Diego, CA (US); Kiran Venugopal, Raritan, NJ (US); Jung Ho Ryu, Fort Lee, NJ (US); Tao Luo, San Diego, CA (US); Junyi Li, Chester, NJ (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/920,331

(22) Filed: Jul. 2, 2020

(65) Prior Publication Data

US 2021/0045115 A1 Feb. 11, 2021

Related U.S. Application Data

(60) Provisional application No. 62/888,302, filed on Aug. 16, 2019, provisional application No. 62/870,930, filed on Jul. 5, 2019.

(51) Int. Cl.
*H04W 72/04* (2009.01)
*H04W 76/15* (2018.01)
(Continued)

(52) U.S. Cl.
CPC ...... *H04W 72/0453* (2013.01); *H04B 7/0408* (2013.01); *H04W 48/16* (2013.01);
(Continued)

(58) Field of Classification Search
CPC .... H04W 72/04; H04W 72/082; H04W 48/12
(Continued)

(56) References Cited

U.S. PATENT DOCUMENTS 8,428,640 B2 * 4/2013 Kim ................ H04W 72/082
455/522
8,812,006 B2 * 8/2014 Sagfors ............ H04W 48/12
455/446
(Continued)

FOREIGN PATENT DOCUMENTS

JP 2013123273 A * 6/2013 ........ H04W 52/0261
WO WO-2021007137 A1 * 1/2021 ........... H04L 5/0098

OTHER PUBLICATIONS

D. Garcia-Roger, E. E. González, D. Martín-Sacristán and J. F. Monserrat, "V2X Support in 3GPP Specifications: From 4G to 5G and Beyond," in IEEE Access, vol. 8, pp. 190946-190963, 2020, doi: 10.1109/ACCESS.2020.3028621. Oct. 2020 (Year: 2020).*
(Continued)

*Primary Examiner* — William D Cumming
(74) *Attorney, Agent, or Firm* — Changwoo Yang

(57) ABSTRACT

A method, apparatus, and computer readable medium for wireless communications for receiving, by a network entity from a user equipment (UE), a component carrier/bandwidth portion (CC/BWP) grouping capability message that indicates a capability of the UE to support CC/BWP group-based signaling; transmitting, by the network entity to the UE, a CC/BWP grouping indication that identifies at least one CC/BWP group based on the CC/BWP grouping capability message; transmitting, by the network entity to the UE, a CC/BWP configuration message that includes CC/BWP group configuration information that identifies a CC/BWP group configuration for the at least one CC/BWP group; communicating, by the network entity with the UE, on at least one CC/BWP of the at least one CC/BWP group based on one or more communication parameters configured according to the CC/BWP group configuration.

30 Claims, 8 Drawing Sheets

(51) Int. Cl.
  *H04W 76/11* (2018.01)
  *H04B 7/0408* (2017.01)
  *H04W 48/16* (2009.01)
(52) U.S. Cl.
  CPC .......... *H04W 72/048* (2013.01); *H04W 76/11* (2018.02); *H04W 76/15* (2018.02)
(58) Field of Classification Search
  USPC ........ 455/446, 507, 522; 370/208, 280, 329, 370/343
  See application file for complete search history.

(56) References Cited

U.S. PATENT DOCUMENTS

| | | | | | |
|---|---|---|---|---|---|
| 8,891,350 | B2* | 11/2014 | Fu | ..................... | H04L 5/0007 370/208 |
| 9,203,559 | B2* | 12/2015 | Wang | .................... | H04L 1/1861 |
| 9,391,746 | B2* | 7/2016 | Lee | ..................... | H04L 1/1861 |
| 9,967,880 | B2* | 5/2018 | Fu | ..................... | H04L 5/0053 |
| 9,992,794 | B2* | 6/2018 | Wang | .................... | H04L 1/1671 |
| 11,012,197 | B2* | 5/2021 | He | ..................... | H04L 5/001 |
| 11,051,250 | B2* | 6/2021 | Hwang | ............. | H04W 52/0229 |
| 11,102,661 | B2* | 8/2021 | Zhang | ..................... | H04L 5/001 |
| 2009/0124212 | A1* | 5/2009 | Islam | .................... | H04W 76/27 455/70 |
| 2009/0124249 | A1* | 5/2009 | Young | ................... | H04W 72/02 455/422.1 |
| 2009/0129339 | A1* | 5/2009 | Young | .................... | H04W 76/27 370/331 |
| 2010/0002675 | A1* | 1/2010 | Fu | ............................ | H04J 11/00 370/343 |
| 2010/0309836 | A1* | 12/2010 | Sugawara | ......... | H04W 72/1231 370/312 |
| 2011/0083066 | A1* | 4/2011 | Chung | .................. | H03M 13/09 714/807 |
| 2011/0105105 | A1* | 5/2011 | Sagfors | .................. | H04L 5/001 455/422.1 |
| 2011/0105165 | A1* | 5/2011 | Sagfors | ................ | H04W 72/04 455/507 |
| 2011/0235743 | A1* | 9/2011 | Lee | ......................... | H04J 11/00 375/295 |
| 2011/0306352 | A1* | 12/2011 | Young | .................... | H04W 72/02 455/452.1 |
| 2012/0026954 | A1* | 2/2012 | Wang | ..................... | H04L 5/0041 370/329 |
| 2012/0039189 | A1* | 2/2012 | Suzuki | ................. | H04W 24/02 370/252 |
| 2012/0307703 | A1* | 12/2012 | Young | .................... | H04W 72/02 370/311 |
| 2012/0314679 | A1* | 12/2012 | Lee | ....................... | H04L 5/0053 370/329 |
| 2012/0320811 | A1* | 12/2012 | Islam | .................. | H04W 72/042 370/311 |
| 2013/0034029 | A1* | 2/2013 | Lee | ...................... | H04L 1/1861 370/280 |
| 2013/0128787 | A2* | 5/2013 | Young | .................. | H04W 72/02 370/311 |
| 2013/0194981 | A1* | 8/2013 | Wang | .................... | H04L 1/1671 370/280 |
| 2013/0295905 | A1* | 11/2013 | Islam | ................ | H04W 72/0413 455/418 |
| 2013/0336258 | A1* | 12/2013 | Young | ................. | H04W 72/042 370/329 |
| 2015/0036629 | A1* | 2/2015 | Fu | ......................... | H04L 5/0053 370/329 |
| 2015/0208397 | A1* | 7/2015 | Lee | ....................... | H04L 5/0048 370/329 |
| 2016/0057772 | A1* | 2/2016 | Wang | ........................ | H04J 3/16 370/280 |
| 2017/0013672 | A1* | 1/2017 | Islam | .................... | H04W 72/02 |
| 2017/0237533 | A1* | 8/2017 | Lee | ....................... | H04L 5/0023 375/260 |
| 2018/0295641 | A1* | 10/2018 | Wang | ...................... | H04L 5/001 |
| 2019/0082424 | A1 | 3/2019 | Nammi et al. | | |
| 2019/0082425 | A1 | 3/2019 | Li et al. | | |
| 2019/0149275 | A1* | 5/2019 | He | ........................ | H04L 1/1819 370/329 |
| 2019/0239093 | A1* | 8/2019 | Zhang | ................... | H04L 5/0064 |
| 2019/0268883 | A1* | 8/2019 | Zhang | ................... | H04W 16/14 |
| 2020/0022207 | A1* | 1/2020 | Yu | ..................... | H04W 36/0069 |
| 2020/0137588 | A1* | 4/2020 | Zhang | ................ | H04W 72/046 |
| 2020/0178245 | A1* | 6/2020 | Islam | ................. | H04W 72/042 |
| 2020/0267571 | A1* | 8/2020 | Park | ..................... | H04W 72/046 |
| 2020/0351069 | A1* | 11/2020 | Grant | ................... | H04W 72/046 |
| 2020/0358587 | A1* | 11/2020 | Wang | ................. | H04W 72/1268 |
| 2020/0396687 | A1* | 12/2020 | Hwang | .................. | H04W 4/80 |
| 2021/0045115 | A1* | 2/2021 | Bai | ....................... | H04W 76/11 |
| 2021/0219234 | A1* | 7/2021 | Hwang | ............ | H04W 52/0235 |

OTHER PUBLICATIONS

International Search Report and Written Opinion—PCT/US2020/040844—ISA/EPO—dated Oct. 6, 2020.
Nokia et al., "Summary of AI 6.1.2.3.7 QCL", 3GPP Draft, R1-1715074, 3GPP TSG RAN WG1 #90, 3rd Generation Partnership Project (3GPP), Mobile Competence Centre, 650, Route Des Lucioles, F-06921, Sophia-Antipolis, Cedex, France, vol. Ran WG1, No. Prague, Czech Republic, Aug. 21, 2017-Aug. 25, 2017, Aug. 26, 2017 (Aug. 26, 2017), XP051328562, 13 Pages, Retrieved from the Internet: URL:http://www.3gpp.org/ftp/tsg_ran/WG1_RL1/TSGR1_90/Docs/ [retrieved on Aug. 26, 2017], Sections 1-6 and Appendix.
Qualcomm Incorporated: "CA and BWP", 3GPP Draft, R1-1716440, 3GPP TSG RAN WG1 NR AdHoc#3, CA_BWP, 3rd Generation Partnership Project (3GPP), Mobile Competence Centre, 650, Route Des Lucioles, F-06921, Sophia-Antipolis, Cedex, France, vol. RAN WG1, No. Nagoya, Japan, Sep. 18, 2017-Sep. 21, 2017, Sep. 17, 2017, XP051339895, 7 Pages, Retrieved from the Internet: URL: http://www.3gpp.org/ftp/Meetings_3GPP_SYNC/RAN1/Docs/ [retrieved on Sep. 17, 2017], Sections 1-6.

* cited by examiner

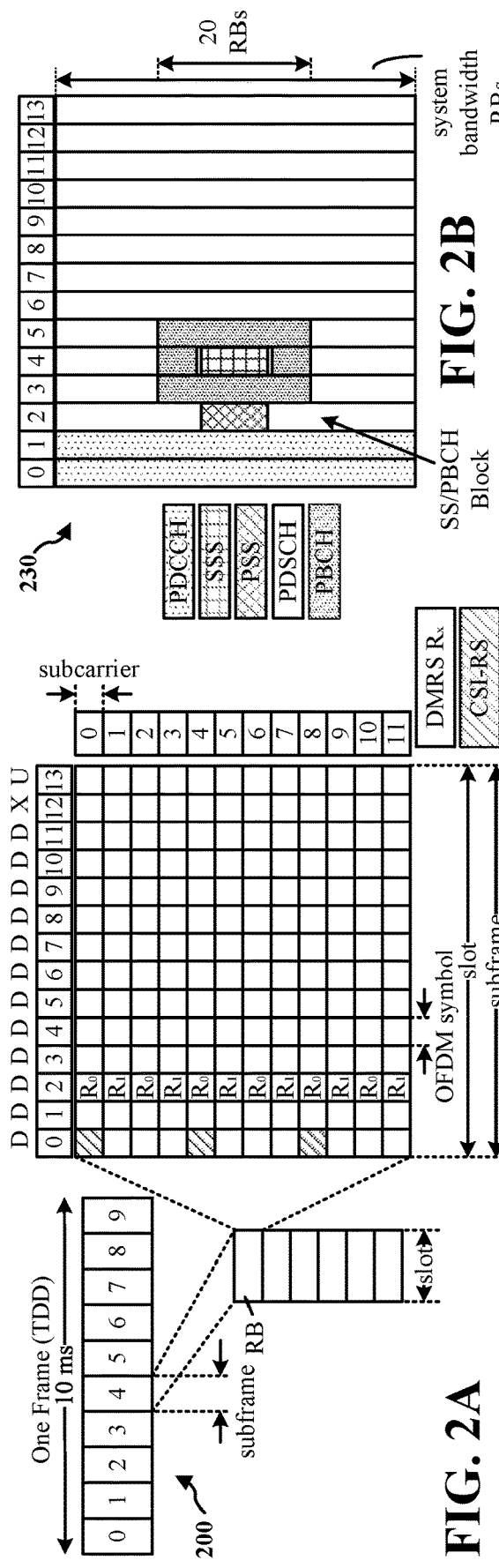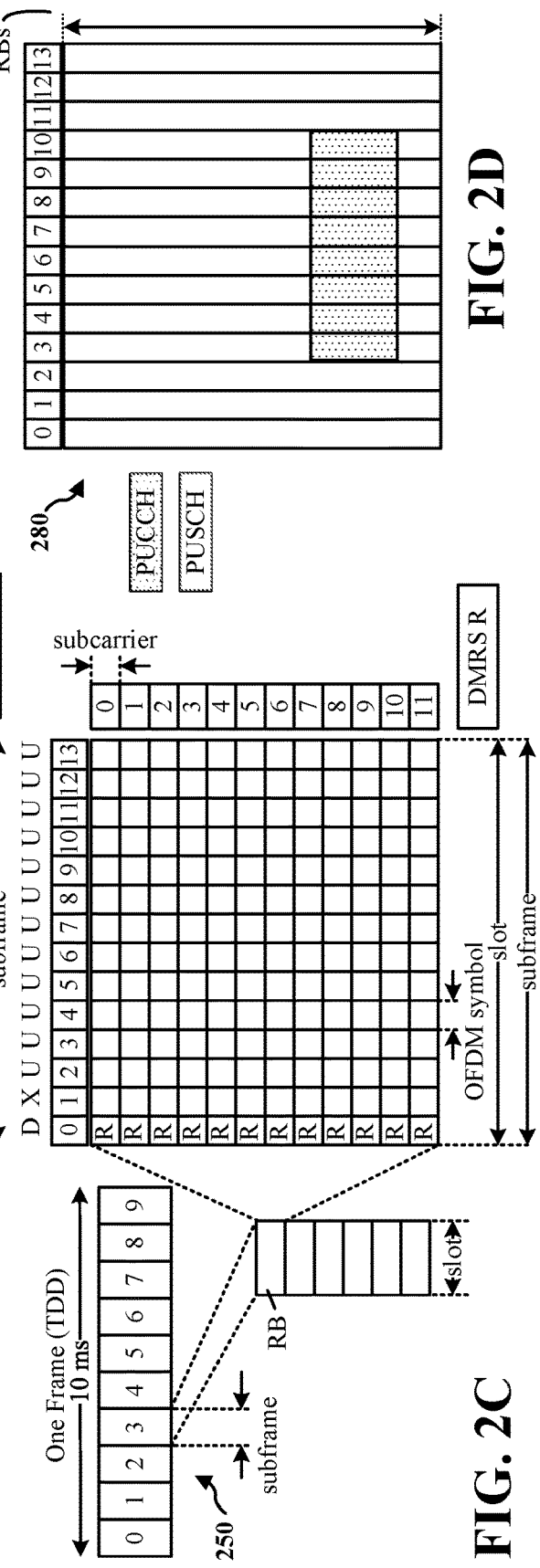
FIG. 2A    FIG. 2B    FIG. 2C    FIG. 2D

GROUP COMPONENT CARRIER BASED UPDATES

CROSS-REFERENCE TO RELATED APPLICATION(S)

The present application claims benefit of U.S. Provisional Application No. 62/870,930 entitled "GROUP COMPONENT CARRIER BASED UPDATES" filed Jul. 5, 2019, and U.S. Provisional Application No. 62/888,302 entitled "GROUP COMPONENT CARRIER BASED UPDATES" filed Aug. 16, 2019, and are assigned to the assignee hereof and hereby expressly incorporated by reference herein.

BACKGROUND

Technical Field

The present disclosure relates generally to communication systems, and more particularly, to communicating component carrier (CC)/bandwidth portion (BWP) group signaling for a user equipment (UE).
Introduction Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes transmitting, by a user equipment (UE) to a network entity, a component carrier/bandwidth portion (CC/BWP) grouping capability message that indicates a capability of the UE to support CC/BWP group-based signaling; receiving, by the UE from the network entity, a CC/BWP grouping indication that identifies at least one CC/BWP group based on the CC/BWP grouping capability message; receiving, by the UE from the network entity, a CC/BWP configuration message that includes CC/BWP group configuration information that identifies a CC/BWP group configuration for the at least one CC/BWP group; configuring, by the UE, one or more communication parameters for each CC/BWP in the at least one CC/BWP group according to the CC/BWP group configuration; and communicating, by the UE with the network entity, on at least one CC/BWP of the at least one CC/BWP group based on the one or more communication parameters configured according to the CC/BWP group configuration.

In a further example, an apparatus for wireless communication is provided that includes a transceiver, a memory configured to store instructions, and one or more processors communicatively coupled with the transceiver and the memory. The aspect may include the one or more processors being configured execute instructions to transmit, by a UE to a network entity, a CC/BWP grouping capability message that indicates a capability of the UE to support CC/BWP group-based signaling; receive, by the UE from the network entity, a CC/BWP grouping indication that identifies at least one CC/BWP group based on the CC/BWP grouping capability message; receive, by the UE from the network entity, a CC/BWP configuration message that includes CC/BWP group configuration information that identifies a CC/BWP group configuration for the at least one CC/BWP group; configure, by the UE, one or more communication parameters for each CC/BWP in the at least one CC/BWP group according to the CC/BWP group configuration; and communicate, by the UE with the network entity, on at least one CC/BWP of the at least one CC/BWP group based on the one or more communication parameters configured according to the CC/BWP group configuration.

In another aspect, an apparatus for wireless communication is provided that includes means for transmitting, by a UE to a network entity, a CC/BWP grouping capability message that indicates a capability of the UE to support CC/BWP group-based signaling; means for receiving, by the UE from the network entity, a CC/BWP grouping indication that identifies at least one CC/BWP group based on the CC/BWP grouping capability message; means for receiving, by the UE from the network entity, a CC/BWP configuration message that includes CC/BWP group configuration information that identifies a CC/BWP group configuration for the at least one CC/BWP group; means for configuring, by the UE, one or more communication parameters for each CC/BWP in the at least one CC/BWP group according to the CC/BWP group configuration; and means for communicating, by the UE with the network entity, on at least one CC/BWP of the at least one CC/BWP group based on the one or more communication parameters configured according to the CC/BWP group configuration.

In yet another aspect, a non-transitory computer-readable medium is provided including one or more processor executing code for transmitting, by a UE to a network entity, a component CC/BWP grouping capability message that indicates a capability of the UE to support CC/BWP group-based signaling; code for receiving, by the UE from the network entity, a CC/BWP grouping indication that identifies at least one CC/BWP group based on the CC/BWP grouping capability message; code for receiving, by the UE from the network entity, a CC/BWP configuration message that includes CC/BWP group configuration information that identifies a CC/BWP group configuration for the at least one CC/BWP group; code for configuring, by the UE, one or more communication parameters for each CC/BWP in the at least one CC/BWP group according to the CC/BWP group configuration; and code for communicating, by the UE with the network entity, on at least one CC/BWP of the at least one CC/BWP group based on the one or more communication parameters configured according to the CC/BWP group configuration.

In another example, a method for wireless communication includes receiving, by a network entity from a UE, a CC/BWP grouping capability message that indicates a capability of the UE to support CC/BWP group-based signaling; transmitting, by the network entity to the UE, a CC/BWP grouping indication that identifies at least one CC/BWP group based on the CC/BWP grouping capability message; transmitting, by the network entity to the UE, a CC/BWP configuration message that includes CC/BWP group configuration information that identifies a CC/BWP group configuration for the at least one CC/BWP group; communicating, by the network entity with the UE, on at least one CC/BWP of the at least one CC/BWP group based on one or more communication parameters configured according to the CC/BWP group configuration.

In a further example, an apparatus for wireless communication is provided that includes a transceiver, a memory configured to store instructions, and one or more processors communicatively coupled with the transceiver and the memory. The aspect may include the one or more processors being configured execute instructions to receive, by a network entity from a UE, a CC/BWP grouping capability message that indicates a capability of the UE to support CC/BWP group-based signaling; transmit, by the network entity to the UE, a CC/BWP grouping indication that identifies at least one CC/BWP group based on the CC/BWP grouping capability message; transmit, by the network entity to the UE, a CC/BWP configuration message that includes CC/BWP group configuration information that identifies a CC/BWP group configuration for the at least one CC/BWP group; and communicating, by the network entity with the UE, on at least one CC/BWP of the at least one CC/BWP group based on one or more communication parameters configured according to the CC/BWP group configuration.

In another aspect, an apparatus for wireless communication is provided that includes means for receiving, by a network entity from a UE, a CC/BWP grouping capability message that indicates a capability of the UE to support CC/BWP group-based signaling; means for transmitting, by the network entity to the UE, a CC/BWP grouping indication that identifies at least one CC/BWP group based on the CC/BWP grouping capability message; means for transmitting, by the network entity to the UE, a CC/BWP configuration message that includes CC/BWP group configuration information that identifies a CC/BWP group configuration for the at least one CC/BWP group; and means for communicating, by the network entity with the UE, on at least one CC/BWP of the at least one CC/BWP group based on one or more communication parameters configured according to the CC/BWP group configuration.

In yet another aspect, a non-transitory computer-readable medium is provided including one or more processor executing code for receiving, by a network entity from a UE, a CC/BWP grouping capability message that indicates a capability of the UE to support CC/BWP group-based signaling; code for transmitting, by the network entity to the UE, a CC/BWP grouping indication that identifies at least one CC/BWP group based on the CC/BWP grouping capability message; code for transmitting, by the network entity to the UE, a CC/BWP configuration message that includes CC/BWP group configuration information that identifies a CC/BWP group configuration for the at least one CC/BWP group; and code for communicating, by the network entity with the UE, on at least one CC/BWP of the at least one CC/BWP group based on one or more communication parameters configured according to the CC/BWP group configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of UL channels within a 5G/NR subframe.

DETAILED DESCRIPTION

Figure 1:
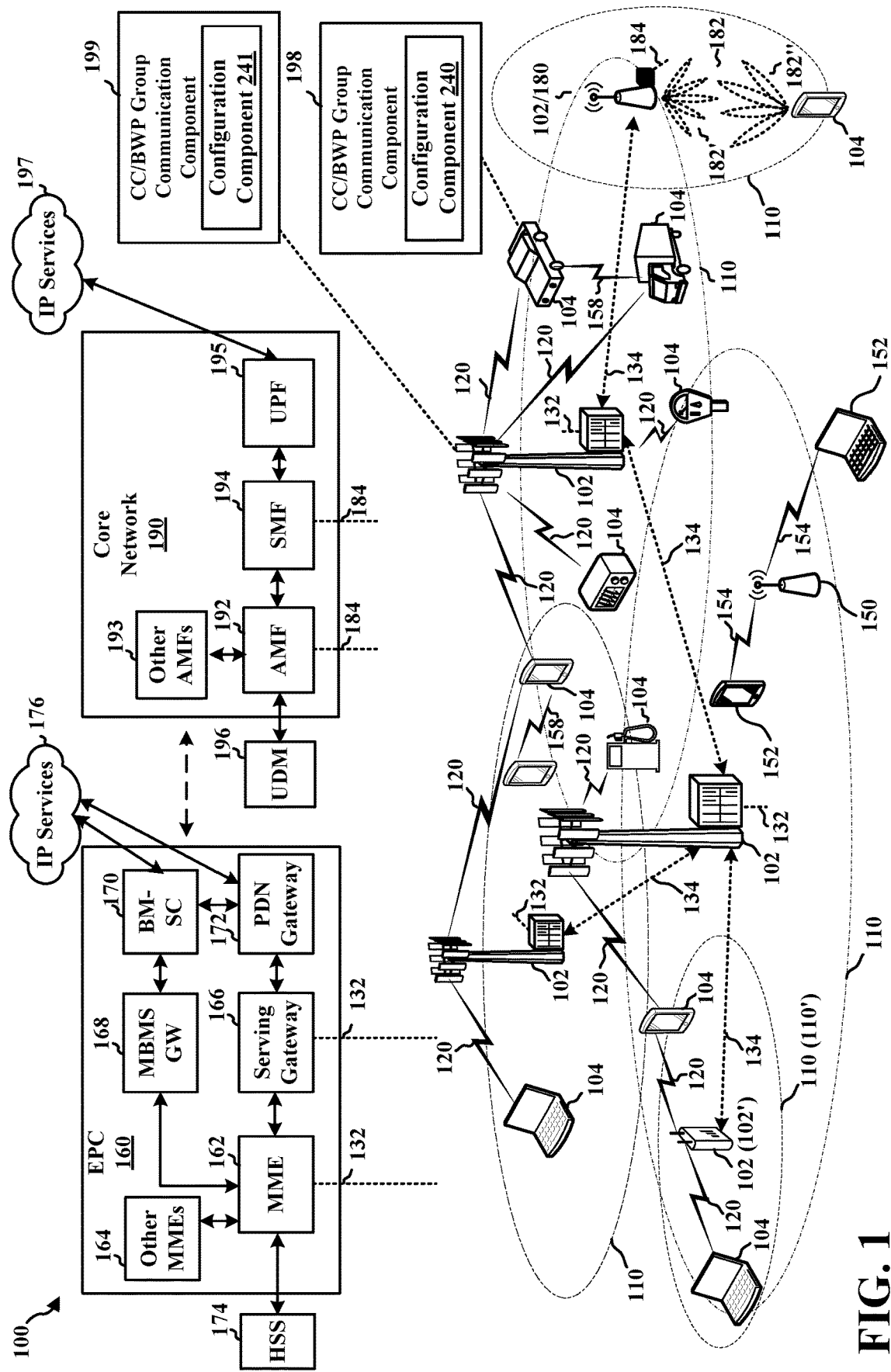
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The described aspects relate to apparatus and methods for group component carrier (CC) or bandwidth part (BWP) based signaling, which may reduce overhead in wireless communication systems. For example, in an aspect, one or more parameters of a communication configuration of a UE may be applicable to or shared by more than one CC or BWP used by the UE. As such, the present disclosure provides techniques for grouping together a plurality of CCs/BWPs, and performing group-based configuration signaling to effect parameter changes to the configuration of each CC/BWP in the group.

FIG. 1 is a diagram illustrating an example of a wireless communications system and an access network 100 configured for group CC/BWP-based signaling. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate CC/BWP group communication component 198 to transmit to a network entity (e.g., base station 102), a CC/BWP grouping capability message that indicates a capability of the UE 104 to support CC/BWP group-based signaling. The UE 104 may receive, from the network entity 102, a CC/BWP grouping indication that identifies at least one CC/BWP group based on the CC/BWP grouping capability message, and receive, from the network entity 102, a CC/BWP configuration message that includes CC/BWP group configuration information that identifies a CC/BWP group configuration for the at least one CC/BWP group. UE 104 and/or CC/BWP group communication component 198 may include configuration component 240, which may be configured to configure one or more communication parameters for each CC/BWP in the at least one CC/BWP group according to the CC/BWP group configuration. As such, the UE 104 may communicate with the network entity 102, on at least one CC/BWP of the at least one CC/BWP group based on the one or more communication parameters configured according to the CC/BWP group configuration.

Correspondingly, in certain aspects, the network entity 102 (e.g., base station) may be configured to operate CC/BWP group communication component 199 and/or configuration component 241 to receive from a UE 104, a CC/BWP grouping capability message that indicates a capability of the UE 104 to support CC/BWP group-based signaling. CC/BWP group communication component 199 may transmit to the UE 104, a CC/BWP grouping indication that identifies at least one CC/BWP group based on the CC/BWP grouping capability message and a CC/BWP configuration message that includes CC/BWP group configuration information that identifies a CC/BWP group configuration for the at least one CC/BWP group. Furthermore, CC/BWP group communication component 199 may communicate, with the UE 104, on at least one CC/BWP of the at least one CC/BWP group based on one or more communication parameters configured according to the CC/BWP group configuration.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$ there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH)

carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (B S R), a power headroom report (PHR), and/or UCI.

Figure 3:
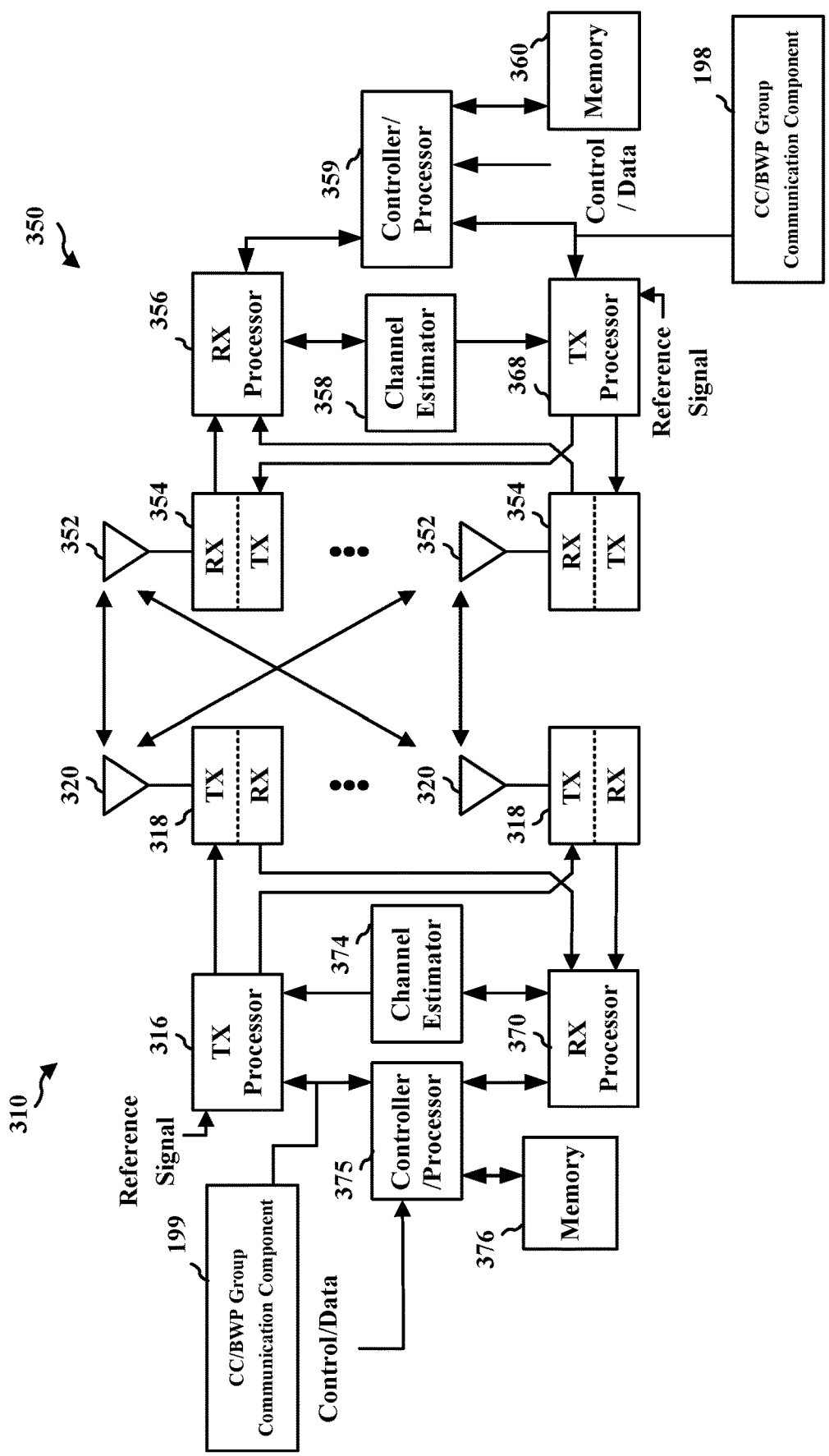
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with CC/BWP group communication component 198 of FIG. 1.

At least one of the TX processor 316, the RX processor 370, and the controller/processor 375 may be configured to perform aspects in connection with CC/BWP group communication component 199 of FIG. 1.

Referring to FIGS. 4-8, the described features generally relate to the communicating component carrier (CC)/bandwidth portion (BWP) group signaling for a UE. For example, in Release 15, activation and/or deactivation of certain configurations (e.g., transmission configuration indicator (TCI) state, secondary cell (Scell), channel state information (CSI) resource signal (RS) resource set) are established for specific CCs or BWPs. Furthermore, the configuration signaling is sent via medium access control (MAC) control element (CE). In an example, a field, named BWP/CC ID, in MAC-CE message defines the applicable CC/BWP of the configuration.

In millimeter wave (mmW) for 5G NR communications (corresponding to a specific part of the radio frequency spectrum between 24 GHz and 100 GHz, which have a very short wavelength), many configurations may be shared between multiple CCs/BWPs. For example, this may include a Quasi Co Location (QCL) Type D relationship between a TCI state that may hold between CCs in a band. Another example may include a resource signal (RS) QCL Type D with a TCI beam in a CC that may also be the QCL Type D RS for the TCI beam in another CC.

For example, in an aspect, the present disclosure includes a method, apparatus, and computer readable medium (e.g., non-transitory computer readable medium) for wireless communications for efficiently communicating CC/BWP signaling for a UE. Accordingly, to reduce signaling overhead, UE 104 and network entity 102 may communicate using CC/BWP group based signaling. That is, CCs/BWPs with similar and/or same properties may be grouped together. The aspect may include transmitting, by a UE to a network entity, a CC/BWP grouping capability message that indicates a capability of the UE to support CC/BWP group-based signaling; receiving, by the UE from the network entity, a CC/BWP grouping indication that identifies at least one CC/BWP group based on the CC/BWP grouping capability message; receiving, by the UE from the network entity, a CC/BWP configuration message that includes CC/BWP group configuration information that identifies a CC/BWP group configuration for the at least one CC/BWP group; configuring, by the UE, one or more communication parameters for each CC/BWP in the at least one CC/BWP group according to the CC/BWP group configuration; and communicating, by the UE with the network entity, on at least one CC/BWP of the at least one CC/BWP group based on the one or more communication parameters configured according to the CC/BWP group configuration.

In another example, in an aspect, the present disclosure includes a method, apparatus, and computer readable medium (e.g., non-transitory computer readable medium) for wireless communications for receiving, by a network entity from a UE, a CC/BWP grouping capability message that indicates a capability of the UE to support CC/BWP group-based signaling; transmitting, by the network entity to the UE, a CC/BWP grouping indication that identifies at least one CC/BWP group based on the CC/BWP grouping capability message; transmitting, by the network entity to the UE, a CC/BWP configuration message that includes CC/BWP group configuration information that identifies a CC/BWP group configuration for the at least one CC/BWP group; and communicating, by the network entity with the UE, on at least one CC/BWP of the at least one CC/BWP group based on one or more communication parameters configured according to the CC/BWP group configuration.

Figure 4:
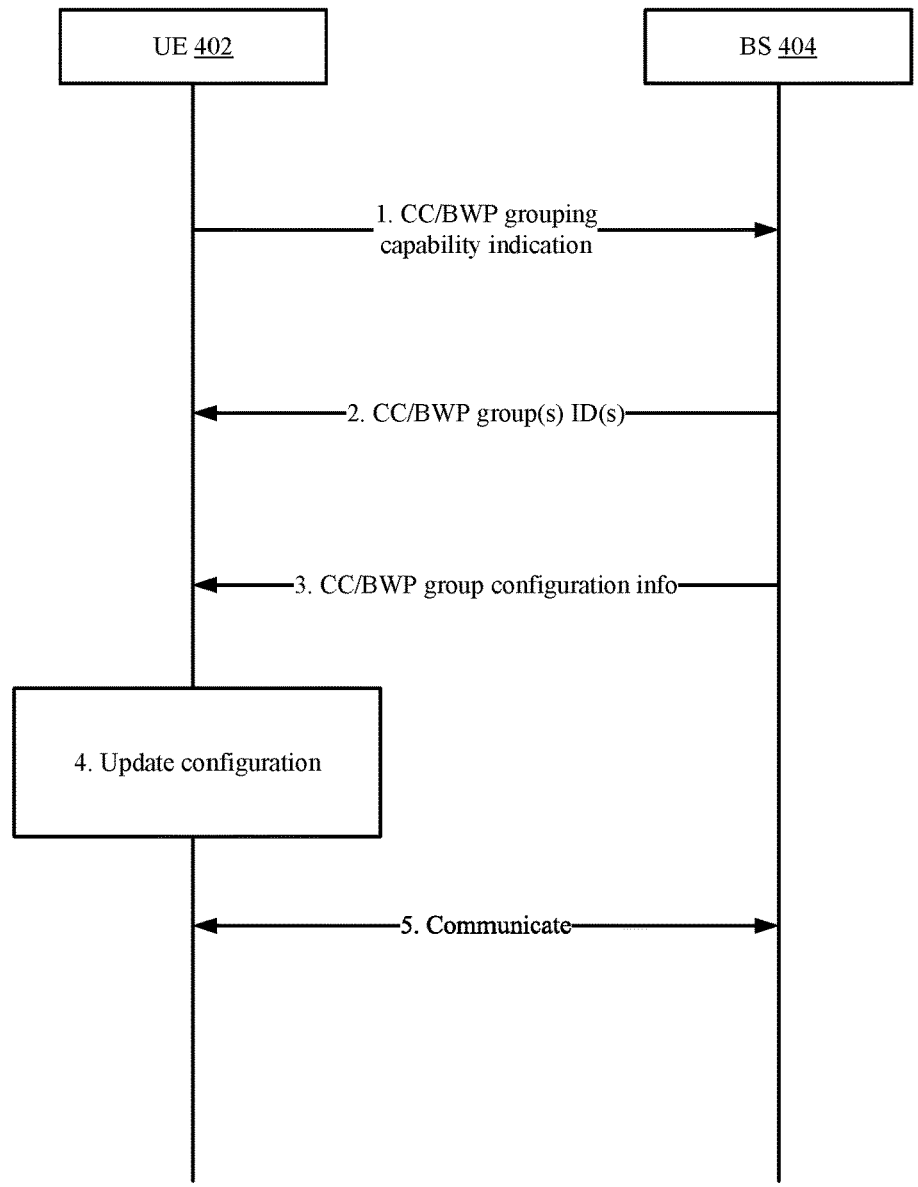
FIG. 4 is a diagram illustrating an example of communicating CC/BWP group signaling between a UE and a network entity.

FIG. 4 is a diagram 400 illustrating an example of communicating CC/BWP group signaling between UE 402 and base station (BS) 404. For example, UE 402 may be similar to or the same as UE 104 of FIG. 1, and BS 404 may be similar to or the same as base stations 102.

In an aspect, at step 1, UE 402 may transmit a CC/BWP grouping capability indication to BS 404. In an example, the CC/BWP grouping capability indication indicates a capability of the UE 402 to support CC/BWP group-based signaling. At step 2, BS 404 may transmit CC/BWP group(s) ID(s) to UE 402. For example, the C/BWP group(s) ID(s) identifies at least one CC/BWP group based on the CC/BWP grouping capability message. At step 3, BS 404 may transmit CC/BWP group configuration information to UE 402. For example, the CC/BWP group configuration information identifies a CC/BWP group configuration for the at least one CC/BWP group.

At step 4, UE 402 may update the configuration of the CC/BWP group(s). For example, UE 402 may configure one or more communication parameters for each CC/BWP in the at least one CC/BWP group according to the CC/BWP group configuration. At step 5, UE 402 and BS 404 may communicate on at least one CC/BWP of the at least one CC/BWP group based on the one or more communication parameters configured according to the CC/BWP group configuration.

Figure 5:
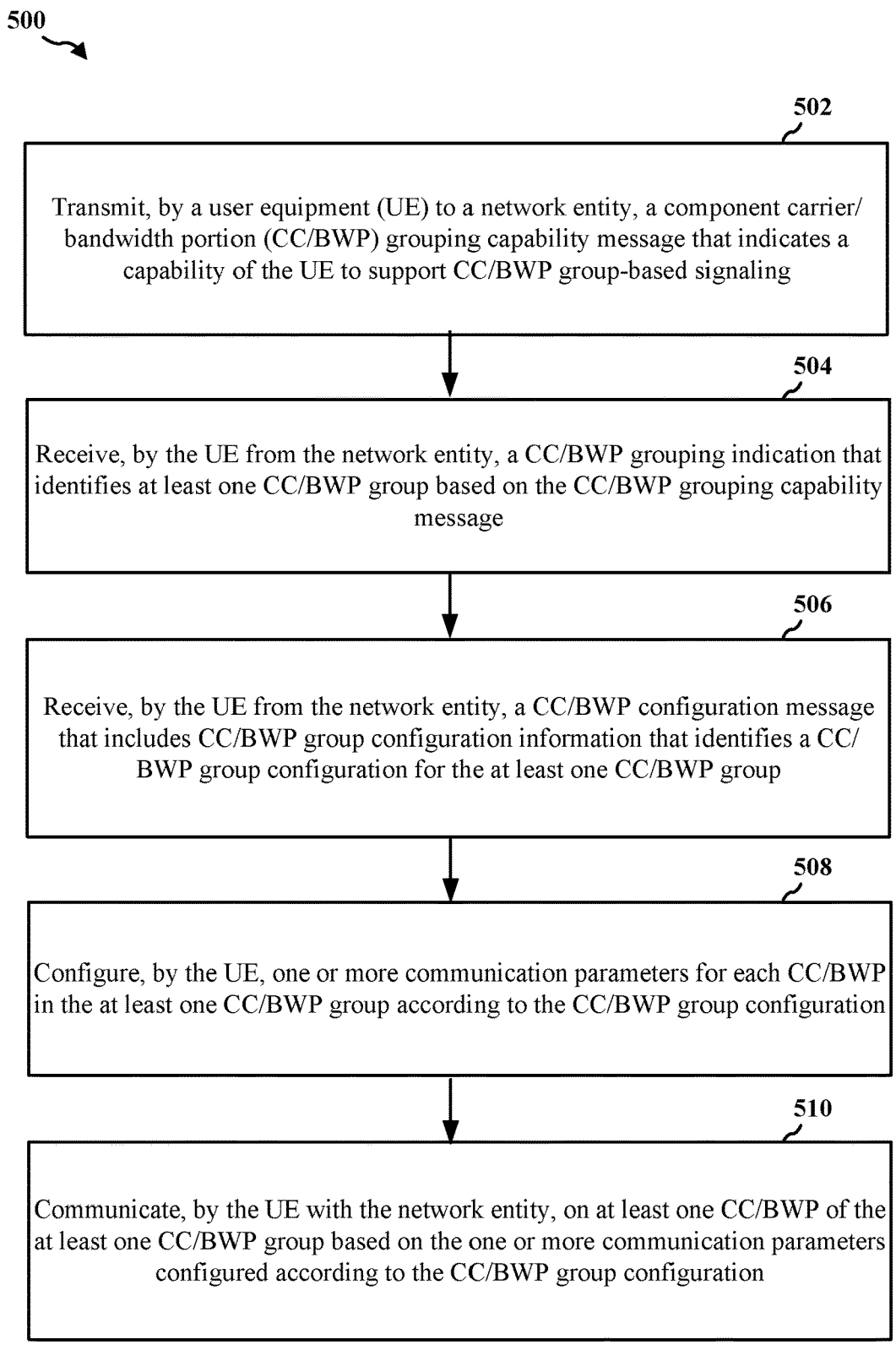
FIG. 5 is a flowchart of a method of wireless communication of a UE capable of communicating in a CC/BWP group signaling framework.

FIG. 5 is a flowchart 500 of a method of wireless communication. The method may be performed by a UE (e.g., the UE 104; the apparatus 350; the controller/processor 359, which may include the memory 360, processor(s) 812, which may include the memory 816, modem 840 and which may be the entire UE 104 or a component of the UE 104, such as the TX processor 368, the RX processor 356, and/or the transceiver 802).

At 502, method 500 includes transmitting, by a user equipment (UE) to a network entity, a component carrier/bandwidth portion (CC/BWP) grouping capability message that indicates a capability of the UE to support CC/BWP group-based signaling. In an aspect, the UE 104 and/or the CC/BWP group communication component 198, e.g., in conjunction with controller/processor 359, which may include the memory 360, processor(s) 812, which may include the memory 816, modem 840, TX processor 368, and transceiver 802 may transmit to a network entity 102, a CC/BWP grouping capability message that indicates a capability of the UE to support CC/BWP group-based signaling. As such, the UE 104 and/or the CC/BWP group communication component 198, e.g., in conjunction with controller/processor 359, which may include the memory 360, processor(s) 812, which may include the memory 816, modem 840, TX processor 368, and transceiver 802 may define a means for transmitting to a network entity 102, a CC/BWP grouping capability message that indicates a capability of the UE 104 to support CC/BWP group-based signaling.

In an example, the CC/BWP grouping capability message indicates at least one band-wise group or at least one spatially Quasi Co Location (QCL) CC group or subband. For example, the at least one band-wise group may be indicated by one-bit per band, wherein all configured CCs/BWPs on each band belong to one CC/BWP group, or by one-bit for all configured bands, wherein all configured CCs/BWPs per band belong to the one CC/BWP group. In a further example, the at least one spatially QCL CC group or subband includes a starting and an ending CC index per CC/BWP group.

In an example, the CC/BWP grouping capability message further includes one or more of a total number of active TCI states, a total number of active spatial relations per band, or a total number of active CC groups. Further, in an example, the CC/BWP grouping capability message further includes a maximum number of CCs the UE supports within a corresponding CC/BWP group.

At 504, method 500 includes receiving, by the UE from the network entity, a CC/BWP grouping indication that identifies at least one CC/BWP group based on the CC/BWP grouping capability message. In an aspect, the UE 104 and/or the CC/BWP group communication component 198, e.g., in conjunction with controller/processor 359, which may include the memory 360, processor(s) 812, which may include the memory 816, modem 840, RX processor 356, and transceiver 802 may receive from the network entity 102, a CC/BWP grouping indication that identifies at least one CC/BWP group based on the CC/BWP grouping capability message. As such, CC/BWP group communication component 198, e.g., in conjunction with controller/processor 359, which may include the memory 360, processor(s) 812, which may include the memory 816, modem 840, RX processor 356, and transceiver 802 may define a means for receiving, from the network entity 102, a CC/BWP grouping indication that identifies at least one CC/BWP group based on the CC/BWP grouping capability message.

In an example, receiving the CC/BWP grouping indication that identifies the at least one CC/BWP group comprises receiving at least one of an implicit CC/BWP grouping or an explicit CC/BWP grouping. For example, the implicit CC/BWP grouping indicates that all configured CCs/BWPs per band belong to one CC/BWP group, or indicates that each band includes only a single one of a cell group. In an example, the cell group comprises one or both of a master cell group (MCG) or a secondary cell group (SCG). Further, for example, the cell group comprises a CC group. In an example, the explicit CC/BWP grouping indicates one or more CC indices per CC group.

At 506, method 500 includes receiving, by the UE from the network entity, a CC/BWP configuration message that includes CC/BWP group configuration information that identifies a CC/BWP group configuration for the at least one CC/BWP group. In an aspect, the UE 104 and/or the CC/BWP group communication component 198, e.g., in conjunction with controller/processor 359, which may include the memory 360, processor(s) 812, which may include the memory 816, modem 840, RX processor 356, and transceiver 802 may receive, from the network entity 102, a CC/BWP configuration message that includes CC/BWP group configuration information that identifies a CC/BWP group configuration for the at least one CC/BWP group. As such, CC/BWP group communication component 198, e.g., in conjunction with controller/processor 359, which may include the memory 360, processor(s) 812, which may include the memory 816, modem 840, RX processor 356, and transceiver 802 may define a means for receiving, from the network entity 102, a CC/BWP configuration message that includes CC/BWP group configuration information that identifies a CC/BWP group configuration for the at least one CC/BWP group.

In an example, receiving the CC/BWP configuration message further comprises further comprising receiving an activation signal configured to activate group CC based communication, or receiving a deactivation signal configured to deactivate the group CC based communication.

In a further example, receiving the CC/BWP configuration message further comprises receiving the CC/BWP configuration message from only a secondary primary cell (SPCell) (e.g., a predefined cell) associated with the at least one CC/BWP group, or from any cell associated with the at least one CC/BWP group, or from any cell associated with the UE with an indication to apply the CC/BWP configuration message to the at least one CC/BW group.

In an example, the CC/BWP configuration message activates either all of the one or more CCs associated with the at least one CC/BWP group or all of the one or more CCs associated with the at least one CC/BWP group associated with the cell from which the CC/BWP configuration message is received.

In an example, the CC/BWP configuration message comprises a first CC/BWP configuration message, and further comprising receiving, after a minimum time gap, a second CC/BWP configuration message that includes second CC/BWP group-based signaling configuration information that identifies a second CC/BWP group configuration for the at least one based on the CC/BWP group.

In an example, receiving the CC/BWP configuration message comprises receiving a medium access control (MAC) control element (CE) including at least one CC/BW identifier (ID) to identify the at least one CC/BWP group. Further, for example, a value of the CC/BWP ID comprises a null value or a default value or a CC/BWP group ID.

In an example, receiving the CC/BWP configuration message comprises receiving a MAC CE including at least one CC/BW group ID to identify the at least one CC/BWP group.

In an example, receiving the CC/BWP configuration message comprises receiving an activate CC group MAC CE to activate the at least one CC/BWP group, or receiving a deactivate MAC CE to deactivate the at least one CC/BWP group.

In an example, receiving the CC/BWP configuration message comprises receiving one of: a secondary cell (Scell) activation/deactivation MAC CE; a transmission configuration indicator (TCI) state or spatial relation activation/deactivation message; a channel state information reference signal (CSI-RS) resource set or sounding reference signal (SRS) activation/deactivation message; or a CSI-RS reporting activation/deactivation message.

Further, in an example, the TCI state or spatial relation activation/deactivation message comprises one of TCI state activation/deactivation for a UE-specific Physical Downlink Shared Channel (PDSCH) MAC CE, a TCI state indication for a UE-specific Physical Downlink Channel (PDDCH) MAC CE, or a Physical Uplink Control Channel (PUCCH) spatial relation activation/deactivation MAC CE.

In an example, method 500 may include activating spatial relation information for one or more semi-persistent (SP)/access point (AP) SRS resources by a MAC CE for a set of CC/BWPs for at least a same bandwidth; and applying the spatial relation information for the one or more SP/AP SRS resources with a same SRS resource ID for all BWPs in indicated CCs, wherein the indicated CCs are included in the applicable list by RRC signaling.

Further, the CC/BWP grouping indication is a list of CCs sent in RRC. The CC/BWP configuration message includes activation of TCI state for PDSCH or spatial information for AP/SP SRS. For example, method 500 may include configuring, by the UE, one or more communication parameters for each CC/BWP in the at least one CC/BWP group according to the CC/BWP group configuration. In this example, the same set of TCI-state IDs are applied for the all BWPs in the indicated CCs. Additionally, the Spatial Relation Info is applied for the SP/AP SRS resource(s) with the same SRS resource ID for all the BWPs in the indicated CCs.

In an example, the CSI-RS resource set or SRS activation/deactivation message comprises one of a semi-persistent (SP) CSI RS/CSI-interference measurement (IM) resource set activation/deactivation MAC CE, a SP SRS activation/deactivation MAC CE, a SP zero power (ZP) CSI-RS resource set activation/deactivation MAC CE, or an aperiodic CSI trigger state subselection MAC CE.

In an example, the a CSI-RS reporting activation/deactivation message performs a SP CSI reporting on a PUCCH activation/deactivation MAC CE At 508, method 500 includes configuring, by the UE, one or more communication parameters for each CC/BWP in the at least one CC/BWP group according to the CC/BWP group configuration. In an aspect, the UE 104 and/or the CC/BWP group communication component 198, e.g., in conjunction with controller/processor 359, which may include the memory 360, processor(s) 812, which may include the memory 816, modem 840, and establishing component 240 may configure one or more communication parameters for each CC/BWP in the at least one CC/BWP group according to the CC/BWP group configuration. As such, CC/BWP group communication component 198, e.g., in conjunction with controller/processor 359, which may include the memory 360, processor(s) 812, which may include the memory 816, modem 840, and establishing component 240 may define a means for configuring one or more communication parameters for each CC/BWP in the at least one CC/BWP group according to the CC/BWP group configuration.

At 510, method 500 includes communicating, by the UE with the network entity, on at least one CC/BWP of the at least one CC/BWP group based on the one or more communication parameters configured according to the CC/BWP group configuration. In an aspect, the UE 104 and/or the CC/BWP group communication component 198, e.g., in conjunction with controller/processor 359, which may include the memory 360, processor(s) 812, which may include the memory 816, modem 840, TX processor 368, and transceiver 802 may communicate with the network entity 102, on at least one CC/BWP of the at least one CC/BWP group based on the one or more communication parameters configured according to the CC/BWP group configuration. As such, the UE 104 and/or the CC/BWP group communication component 198, e.g., in conjunction with controller/processor 359, which may include the memory 360, processor(s) 812, which may include the memory 816, modem 840, TX processor 368, and transceiver 802 may define a means for communicating, with the network entity 102, on at least one CC/BWP of the at least one CC/BWP group based on the one or more communication parameters configured according to the CC/BWP group configuration.

In an example use case, method 500 may further include identifying a Quasi Co Location (QCL) relationship between two or more beams in a first CC/BWP; and applying the QCL relationship between the two or more beams in the first CC/BWP to one or more transmission configuration indicator (TCI) states in a second CC/BWP of a same CC/BWP group. For example, the QCL relationship corresponds to a QCL Type D relationship enabling two or more beams to be received using a same receiver beamforming configuration. As such, the UE 104 and/or the configuration component 198, e.g., in conjunction with controller/processor 359, which may include the memory 360, processor(s) 812, which may include the memory 816, modem 840, TX processor 368, and transceiver 802 may define a means for identifying a QCL relationship between two or more beams in a first CC/BWP; and applying the QCL relationship between the two or more beams in the first CC/BWP to one or more TCI states in a second CC/BWP of a same CC/BWP group. For example, the QCL relationship corresponds to a QCL Type D relationship enabling two or more beams to be received using a same receiver beamforming configuration. In a further example, each of the two or more beams correspond to two or more TCI states.

Figure 6:
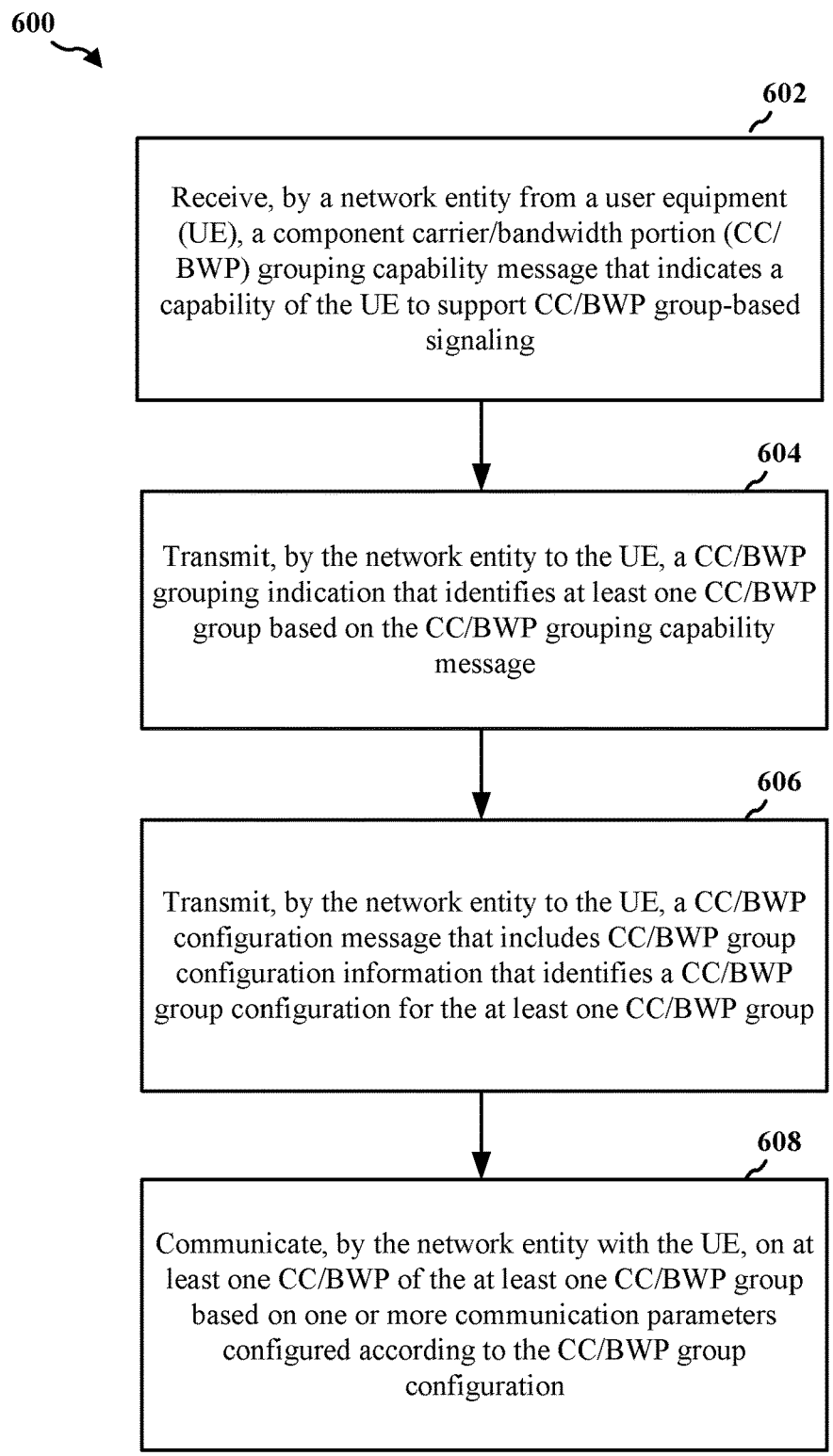
FIG. 6 is a flowchart of a method of wireless communication of a network entity capable of communicating in a CC/BWP group signaling framework.

FIG. 6 is a flowchart 600 of a method of wireless communication. The method may be performed by a network entity (e.g., the network entity 102; the controller/processor 375, which may include the memory 376, processor(s) 912, which may include the memory 916, modem 940 and which may be the entire network entity 102 or a component of the network entity 102, such as the TX processor 316, the RX processor 370, and/or the transceiver 902).

At 602, method 600 includes receiving, by a network entity from a UE, a component CC/BWP grouping capability message that indicates a capability of the UE to support CC/BWP group-based signaling. In an aspect, the network entity 102 and/or the CC/BWP group communication component 199, e.g., in conjunction with processor(s) 375/912, memory(s) 376/916, the RX processor 370, and/or the transceiver 902 may receive a CC/BWP grouping capability message that indicates a capability of the UE 104 to support CC/BWP group-based signaling. As such, the network entity 102 and/or the CC/BWP group communication component 199, e.g., in conjunction with controller/processor 375, which may include the memory 376, processor(s) 912, which may include the memory 916, modem 940, RX processor 370, and transceiver 902 may define a means for receiving, by a network entity from a UE, a component CC/BWP grouping capability message that indicates a capability of the UE to support CC/BWP group-based signaling.

At 604, method 600 includes transmitting, by the network entity to the UE, a CC/BWP grouping indication that identifies at least one CC/BWP group based on the CC/BWP grouping capability message. In an aspect, the network entity 102 and/or the CC/BWP group communication component 199, e.g., in conjunction with processor(s) 375/912, memory(s) 376/916, the TX processor 316, and/or the transceiver 902 may transmit a CC/BWP grouping indication that identifies at least one CC/BWP group based on the CC/BWP grouping capability message. As such, the network entity 102 and/or the CC/BWP group communication component 199, e.g., in conjunction with controller/processor 375, which may include the memory 376, processor(s) 912, which may include the memory 916, modem 940, RX processor 370, and transceiver 902 may define a means for transmitting, by the network entity to the UE, a CC/BWP grouping indication that identifies at least one CC/BWP group based on the CC/BWP grouping capability message.

At 606, method 600 includes transmitting, by the network entity to the UE, a CC/BWP configuration message that includes CC/BWP group configuration information that identifies a CC/BWP group configuration for the at least one CC/BWP group. In an aspect, the network entity 102 and/or the CC/BWP group communication component 199, e.g., in conjunction with processor(s) 375/912, memory(s) 376/916, the TX processor 316, and/or the transceiver 902 may transmit a CC/BWP configuration message that includes CC/BWP group configuration information that identifies a CC/BWP group configuration for the at least one CC/BWP group. As such, the network entity 102 and/or the CC/BWP group communication component 199, e.g., in conjunction with controller/processor 375, which may include the memory 376, processor(s) 912, which may include the memory 916, modem 940, RX processor 370, and transceiver 902 may define a means for transmitting, by the network entity to the UE, a CC/BWP configuration message that includes CC/BWP group configuration information that identifies a CC/BWP group configuration for the at least one CC/BWP group.

At 608, method 600 includes communicating, by the network entity with the UE, on at least one CC/BWP of the at least one CC/BWP group based on one or more communication parameters configured according to the CC/BWP group configuration. In an aspect, the network entity 102 and/or the CC/BWP group communication component 199, e.g., in conjunction with processor(s) 375/912, memory(s) 376/916, configuration component 241 may communicate on at least one CC/BWP of the at least one CC/BWP group based on one or more communication parameters configured according to the CC/BWP group configuration. As such, the network entity 102 and/or the CC/BWP group communication component 199, e.g., in conjunction with controller/processor 375, which may include the memory 376, processor(s) 912, which may include the memory 916, modem 940, RX processor 370, and transceiver 902 may define a means for communicating, by the network entity with the UE, on at least one CC/BWP of the at least one CC/BWP group based on one or more communication parameters configured according to the CC/BWP group configuration.

In an example, method 600 may include identifying a QCL relationship between two or more beams in a CC/BWP group; indicating to a UE the QCL relationship between the two or more beams in a first CC/BWP in the CC group to one or more TCI states; and communicating to UE on a second CC/BWP in the same CC group based on the indicated QCL relationship in the first CC. For example, the QCL relationship corresponds to a QCL Type D relationship enabling two or more beams to be received using a same receiver beamforming configuration. In a further example, each of the two or more beams correspond to two or more TCI states. As such, the network entity 102 and/or the CC/BWP group communication component 199, e.g., in conjunction with controller/processor 375, which may include the memory 376, processor(s) 912, which may include the memory 916, modem 940, RX processor 370, and transceiver 902 may define a means for identifying a QCL relationship between two or more beams in a CC/BWP group; indicating to a UE the QCL relationship between the two or more beams in a first CC/BWP in the CC group to one or more TCI states; and communicating to UE on a second CC/BWP in the same CC group based on the indicated QCL relationship in the first CC. For example, the QCL relationship corresponds to a QCL Type D relationship enabling two or more beams to be received using a same receiver beamforming configuration.

In an example, method 600 may include transmitting, by the network entity to the UE, a MAC CE to activate a set of multiple TCI states in the at least one CC/BWP, wherein the MAC CE is configured to activate all of the at least one CC/BWP of the at least one CC/BWP group. As such, the network entity 102 and/or the CC/BWP group communication component 199, e.g., in conjunction with controller/processor 375, which may include the memory 376, processor(s) 912, which may include the memory 916, modem 940, RX processor 370, and transceiver 902 may define a means for transmitting, by the network entity to the UE, a MAC CE to activate a set of multiple TCI states in the at least one CC/BWP, wherein the MAC CE is configured to activate all of the at least one CC/BWP of the at least one CC/BWP group.

In an example of method 600, the set of multiple TCI states correspond to one or more beamformed links communicating with a plurality of transmit reception points (TRPs).

In an example, method 600 may include mapping the set of multiple TCI states to at least one of a virtual TCI state for the plurality of TRPs or a TCI code point in a downlink control indicator (DCI) in the at least one CC/BWP. As such, the network entity 102 and/or the CC/BWP group communication component 199, e.g., in conjunction with controller/processor 375, which may include the memory 376, processor(s) 912, which may include the memory 916, modem 940, RX processor 370, and transceiver 902 may define a means for mapping the set of multiple TCI states to at least one of a virtual TCI state for the plurality of TRPs or a TCI code point in a DCI in the at least one CC/BWP.

In an example of method 600, the MAC CE indicates the mapping between one or more of the multiple TCI states and the TCI code point.

In an example of method 600, the DCI includes a plurality of bits corresponding to a TCI field associated with the mapping of the multiple TCI states.

In an example, method 600 may include mapping a plurality of spatial relations to at least one of a virtual TCI state for of the multiple TCI states or to a spatial relation code point in a DCI in the at least on CC/BWP. As such, the network entity 102 and/or the CC/BWP group communication component 199, e.g., in conjunction with controller/ processor 375, which may include the memory 376, processor(s) 912, which may include the memory 916, modem 940, RX processor 370, and transceiver 902 may define a means for mapping a plurality of spatial relations to at least one of a virtual TCI state for the multiple TCI states or to a spatial relation code point in a DCI in the at least on CC/BWP.

In an example, method 600 may include activating spatial relation information for one or more semi-persistent (SP)/access point (AP) SRS resources by a MAC CE for a set of CC/BWPs for at least a same bandwidth; and applying the spatial relation information for the one or more SP/AP SRS resources with a same SRS resource ID for all BWPs in indicated CCs, wherein the indicated CCs are included in the applicable list by RRC signaling.

Further, the CC/BWP grouping indication is a list of CCs sent in RRC. The CC/BWP configuration message includes activation of TCI state for PDSCH or spatial information for AP/SP SRS. For example, method 600 may include configuring, by the UE, one or more communication parameters for each CC/BWP in the at least one CC/BWP group according to the CC/BWP group configuration. In this example, the same set of TCI-state IDs are applied for the all BWPs in the indicated CCs. Additionally, the Spatial Relation Info is applied for the SP/AP SRS resource(s) with the same SRS resource ID for all the BWPs in the indicated CCs.

Figure 7:
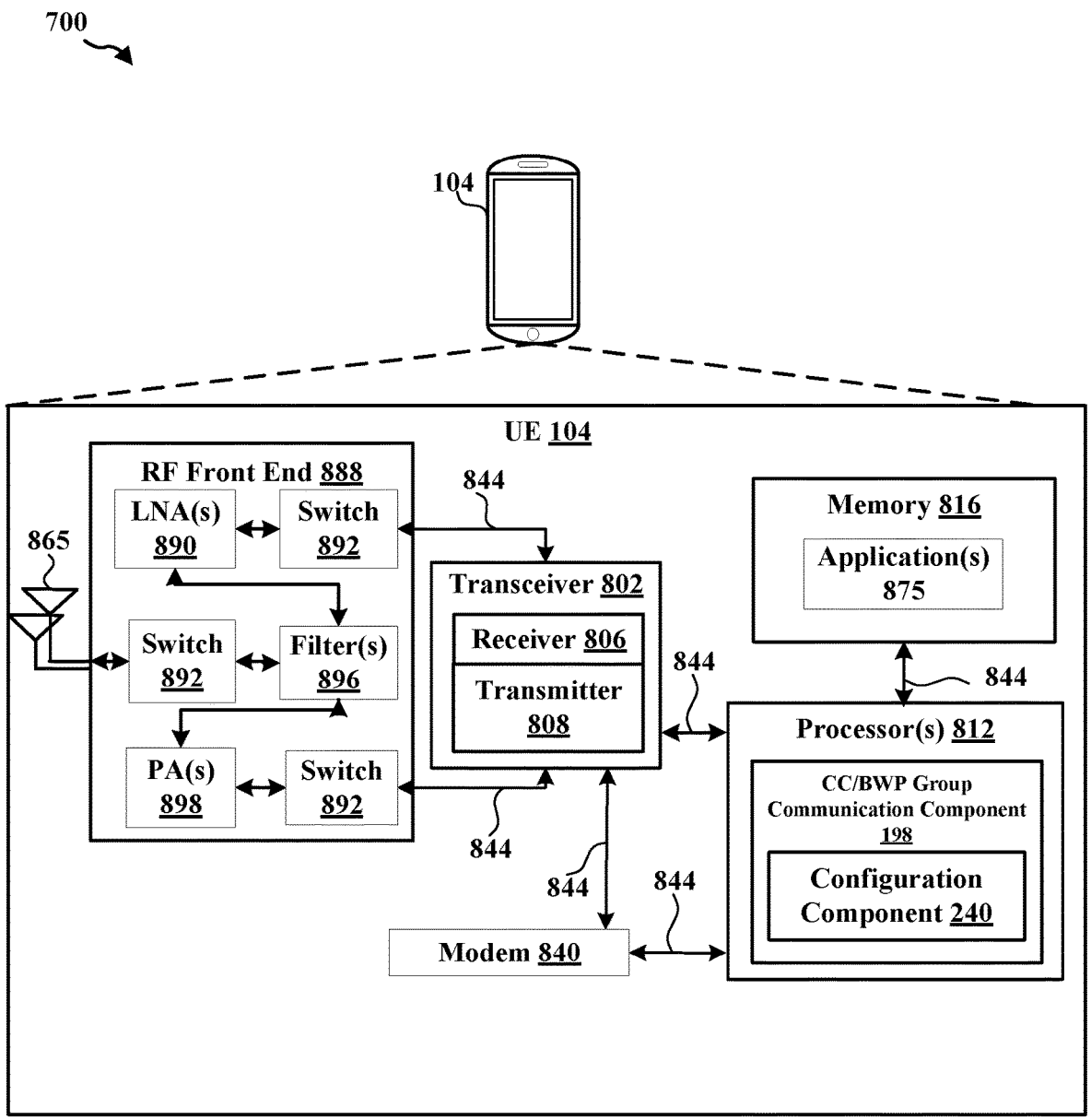
FIG. 7 is a block diagram illustrating an example of a UE, in accordance with various aspects of the present disclosure.

Referring to FIG. 7, one example of an implementation of UE 104 may include a variety of components, some of which have already been described above and are described further herein, including components such as one or more processors 712 and memory 716 and transceiver 702 in communication via one or more buses 744, which may operate in conjunction with modem 740 and/or CC/BWP group communication component 198 for communicating CC/BWP group information.

In an aspect, the one or more processors 712 can include a modem 740 and/or can be part of the modem 740 that uses one or more modem processors. Thus, the various functions related to CC/BWP group communication component 198 may be included in modem 740 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 740 associated with CC/BWP group communication component 198 may be performed by transceiver 702.

Also, memory 716 may be configured to store data used herein and/or local versions of applications 775 or communicating component 742 and/or one or more of its subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining CC/BWP group communication component 198 and/or one or more of its subcomponents, and/or data associated therewith, when UE 104 is operating at least one processor 712 to execute CC/BWP group communication component 198 and/or one or more of its subcomponents.

Transceiver 702 may include at least one receiver 706 and at least one transmitter 708. Receiver 706 may include hardware and/or software executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one base station 102. Additionally, receiver 706 may process such received signals, and also may obtain measurements of the signals, such as, but not limited to, Ec/Io, signal-to-noise ratio (SNR), reference signal received power (RSRP), received signal strength indicator (RSSI), etc. Transmitter 708 may include hardware and/or software executable by a processor for transmitting data, the code comprising instructions and being stored in a memory (e.g., computer-readable medium). A suitable example of transmitter 708 may including, but is not limited to, an RF transmitter.

Moreover, in an aspect, UE 104 may include RF front end 788, which may operate in communication with one or more antennas 765 and transceiver 702 for receiving and transmitting radio transmissions, for example, wireless communications transmitted by at least one base station 102 or wireless transmissions transmitted by UE 104. RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver may be tuned to operate at specified frequencies such that UE 104 can communicate with, for example, one or more base stations 102 or one or more cells associated with one or more base stations 102. In an aspect, for example, modem 740 can configure transceiver 702 to operate at a specified frequency and power level based on the UE configuration of the UE 104 and the communication protocol used by modem 740.

In an aspect, modem 740 can be a multiband-multimode modem, which can process digital data and communicate with transceiver 702 such that the digital data is sent and received using transceiver 702. In an aspect, modem 740 can be multiband and be configured to support multiple frequency bands for a specific communications protocol. In an aspect, modem 740 can be multimode and be configured to support multiple operating networks and communications protocols. In an aspect, modem 740 can control one or more components of UE 104 (e.g., RF front end 788, transceiver 702) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 742 can optionally include mode determining component 752. For example, upon receiving an anchor signal in an initial bandwidth portion from a network entity 102, the anchor signal triggering an initial access procedure for the UE 104, mode determining component 752 may determine whether to operate in a wideband OFDM mode or a wideband SC-FDM mode in response to receiving the anchor signal. Communicating component 742 may then transmit a capability report message to the network entity 102 based on the determination by the mode determining component 752 of whether to operate in the wideband OFDM mode or the wideband SC-FDM mode In an aspect, the processor(s) 712 may correspond to one or more of the processors described in connection with the UE in FIG. 3. Similarly, the memory 716 may correspond to the memory described in connection with the UE in FIG. 3.

Figure 8:
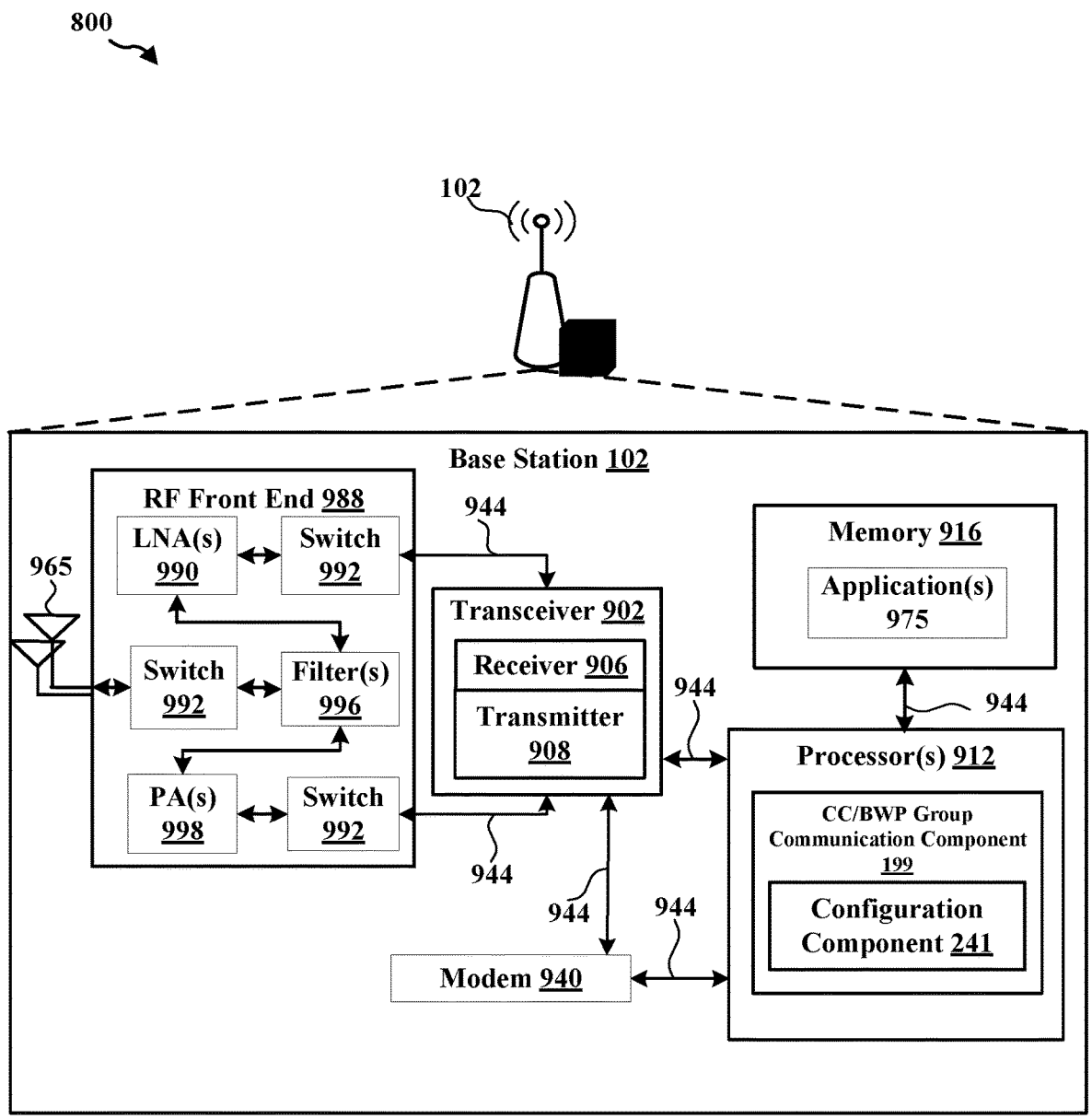
FIG. 8 is a block diagram illustrating an example of a base station, in accordance with various aspects of the present disclosure.

Referring to FIG. 8, one example of an implementation of base station 102 (e.g., a base station 102, as described above) may include a variety of components, some of which have already been described above, but including components such as one or more processors 812 and memory 816 and transceiver 802 in communication via one or more buses 844, which may operate in conjunction with modem 840 and CC/BWP group communication component 199 for communicating CC/BWP group information.

The transceiver 802, receiver 806, transmitter 808, one or more processors 812, memory 816, applications 875, buses 844, RF front end 888, LNAs 890, switches 892, filters 896, PAs 898, and one or more antennas 865 may be the same as or similar to the corresponding components of UE 104, as described above, but configured or otherwise programmed for base station operations as opposed to UE operations.

In an aspect, the processor(s) 812 may correspond to one or more of the processors described in connection with the base station in FIG. 3. Similarly, the memory 816 may correspond to the memory described in connection with the base station in FIG. 3.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
   a transceiver;
   a memory configured to store instructions; and
   one or more processors communicatively coupled with the transceiver and the memory, wherein the one or more processors are configured to execute the instructions to:
   transmit, by a user equipment (UE) to a network entity, a component carrier/bandwidth portion (CC/BWP) grouping capability message that indicates a capability of the UE to support CC/BWP group-based signaling;
   receive, by the UE from the network entity, a CC/BWP grouping indication that identifies at least one CC/BWP group based on the CC/BWP grouping capability message;
   receive, by the UE from the network entity, a CC/BWP configuration message that includes CC/BWP group configuration information that identifies a CC/BWP group configuration for the at least one CC/BWP group;
   configure, by the UE, one or more communication parameters for each CC/BWP in the at least one CC/BWP group according to the CC/BWP group configuration; and
   communicate, by the UE with the network entity, on at least one CC/BWP of the at least one CC/BWP group based on the one or more communication parameters configured according to the CC/BWP group configuration.

2. The apparatus of claim 1, wherein the CC/BWP grouping capability message indicates at least one band-wise group or at least one spatially Quasi Co Location (QCL) CC group or subband.

3. The apparatus of claim 2, wherein the at least one band-wise group is indicated by one-bit per band, wherein all configured CCs/BWPs on each band belong to one CC/BWP group, or by one-bit for all configured bands, wherein all configured CCs/BWPs per band belong to the one CC/BWP group.

4. The apparatus of claim 2, wherein the at least one spatially QCL CC group or subband includes a starting and an ending CC index per CC/BWP group.

5. The apparatus of claim 1, wherein the CC/BWP grouping capability message further includes one or more of a maximum number of active TCI states of a CC/BWP group, a total number of active spatial relations per CC/BWP group, or a total number of active CC groups.

6. The apparatus of claim 1, wherein the CC/BWP grouping capability message further includes a maximum number of CCs the UE supports within a corresponding CC/BWP group.

7. The apparatus of claim 1, wherein the one or more processors are configured to execute the instructions to receive the CC/BWP grouping indication that identifies the at least one CC/BWP group are further configured to receive at least one of an implicit CC/BWP grouping or an explicit CC/BWP grouping.

8. The apparatus of claim 7, wherein the implicit CC/BWP grouping indicates that all configured CCs/BWPs per band belong to one CC/BWP group, or indicates that each band includes only a single one of a cell group.

9. The apparatus of claim 8, wherein the cell group comprises one or both of a master cell group (MCG) or a secondary cell group (SCG).

10. The apparatus of claim 1, wherein the one or more processors are configured to execute the instructions to receive the CC/BWP configuration message are further configured to receive an activation signal configured to activate group CC based communication, or receive a deactivation signal configured to deactivate the group CC based communication.

11. The apparatus of claim 1, wherein the one or more processors are configured to execute the instructions to receive the CC/BWP configuration message are further configured to receive the CC/BWP configuration message from only a predefined cell associated with the at least one CC/BWP group, or from any cell associated with the at least one CC/BWP group, or from any cell associated with the UE with an indication to apply the CC/BWP configuration message to the at least one CC/BW group, and wherein the CC/BWP configuration message activates either all of the one or more CCs associated with the at least one CC/BWP group or all of the one or more CCs associated with the at least one CC/BWP group associated with the cell from which the CC/BWP configuration message is received.

12. The apparatus of claim 1, wherein the CC/BWP configuration message comprises a first CC/BWP configuration message, and further comprising receiving, after a minimum time gap, a second CC/BWP configuration message that includes second CC/BWP group-based signaling configuration information that identifies a second CC/BWP group configuration for the at least one based on the CC/BWP group.

13. The apparatus of claim 1, wherein the one or more processors are configured to execute the instructions to receive the CC/BWP configuration message are further configured to receive a medium access control (MAC) control element (CE) including at least one CC/BW identifier (ID) to identify the at least one CC/BWP group, and wherein a value of the CC/BWP ID comprises a null value or a default value or a CC/BWP group ID.

14. The apparatus of claim 1, wherein the one or more processors are configured to execute the instructions to receive the CC/BWP configuration message are further configured to receive a medium access control (MAC) control element (CE) including at least one CC/BW group identifier (ID) to identify the at least one CC/BWP group.

15. The apparatus of claim 1, wherein the one or more processors are configured to execute the instructions to receive the CC/BWP configuration message are further configured to receive an activate CC group message to activate the at least one CC/BWP group, or receive a deactivate message to deactivate the at least one CC/BWP group.

16. The apparatus of claim 1, wherein the one or more processors are configured to execute the instructions to receive the CC/BWP configuration message are further configured to receive one of:
  a secondary cell (Scell) activation/deactivation medium access control (MAC) control element (CE);
  a transmission configuration indicator (TCI) state or spatial relation activation/deactivation message;
  a channel state information reference signal (CSI-RS) resource set or sounding reference signal (SRS) activation/deactivation message; or
  a CSI-RS reporting activation/deactivation message.

17. The apparatus of claim 16, wherein the TCI state or spatial relation activation/deactivation message comprises one of TCI state activation/deactivation for a UE-specific Physical Downlink Shared Channel (PDSCH) MAC CE, a TCI state indication for a UE-specific Physical Downlink Channel (PDDCH) MAC CE, or a Physical Uplink Control Channel (PUCCH) spatial relation activation/deactivation MAC CE.

18. The apparatus of claim 16, wherein the one or more processors are configured to execute the instructions to:
  activate spatial relation information for one or more semi-persistent (SP)/access point (AP) SRS resources by a MAC CE for a set of CC/BWPs for at least a same bandwidth; and
  apply the spatial relation information for the one or more SP/AP SRS resources with a same SRS resource ID for all BWPs in indicated CCs, wherein the indicated CCs are included in the applicable list by RRC signaling.

19. The apparatus of claim 16, wherein the CSI-RS resource set or SRS activation/deactivation message comprises one of a semi-persistent (SP) channel state information (CSI) resource signal (RS)/CSI-interference measurement (IM) resource set activation/deactivation MAC CE, a SP SRS activation/deactivation MAC CE, a SP zero power (ZP) CSI-RS resource set activation/deactivation MAC CE, or an aperiodic CSI trigger state subselection MAC CE.

20. The apparatus of claim 16, wherein the CSI-RS reporting activation/deactivation message performs a semi-persistent (SP) channel state information (CSI) reporting on a Physical Uplink Control Channel (PUCCH) activation/deactivation MAC CE.

21. The apparatus of claim 1, wherein the one or more processors are configured to execute the instructions to:
  identify a Quasi Co Location (QCL) relationship between two or more beams in a first CC/BWP; and
  apply the QCL relationship between the two or more beams in the first CC/BWP to one or more transmission configuration indicator (TCI) states in a second CC/BWP of a same CC/BWP group.

22. The apparatus of claim 1, wherein the QCL relationship corresponds to a QCL Type D relationship enabling two or more beams to be received using a same receiver beamforming configuration.

23. The apparatus of claim 22, wherein each of the two or more beams correspond to two or more TCI states.

24. An apparatus for wireless communication, comprising:
a transceiver;
a memory configured to store instructions; and
one or more processors communicatively coupled with the transceiver and the memory, wherein the one or more processors are configured to execute the instructions to:
receive, by a network entity from a user equipment (UE), a component carrier/bandwidth portion (CC/BWP) grouping capability message that indicates a capability of the UE to support CC/BWP group-based signaling;
transmit, by the network entity to the UE, a CC/BWP grouping indication that identifies at least one CC/BWP group based on the CC/BWP grouping capability message;
transmit, by the network entity to the UE, a CC/BWP configuration message that includes CC/BWP group configuration information that identifies a CC/BWP group configuration for the at least one CC/BWP group; and
communicate, by the network entity with the UE, on at least one CC/BWP of the at least one CC/BWP group based on one or more communication parameters configured according to the CC/BWP group configuration.

25. The apparatus of claim 24, wherein the one or more processors are configured to execute the instructions to:
identify a Quasi Co Location (QCL) relationship between two or more beams in a CC/BWP group;
indicate to a UE the QCL relationship between the two or more beams in a first CC/BWP in the CC group to one or more transmission configuration indicator (TCI) states; and
communicate to UE on a second CC/BWP in the same CC group based on the indicated QCL relationship in the first CC.

26. The apparatus of claim 25, wherein the QCL relationship corresponds to a QCL Type D relationship enabling two or more beams to be received using a same receiver beamforming configuration.

27. The apparatus of claim 26, wherein each of the two or more beams correspond to two or more TCI states.

28. The apparatus of claim 27, wherein the one or more processors are configured to execute the instructions to:
activate spatial relation information for one or more semi-persistent (SP)/access point (AP) sounding reference signal (SRS) resources by a MAC CE for a set of CC/BWPs for at least a same bandwidth; and
apply the spatial relation information for the one or more SP/AP SRS resources with a same SRS resource ID for all BWPs in indicated CCs, wherein the indicated CCs are included in the applicable list by RRC signaling.

29. A method of communication, comprising:
transmitting, by a user equipment (UE) to a network entity, a component carrier/bandwidth portion (CC/BWP) grouping capability message that indicates a capability of the UE to support CC/BWP group-based signaling;
receiving, by the UE from the network entity, a CC/BWP grouping indication that identifies at least one CC/BWP group based on the CC/BWP grouping capability message;
receiving, by the UE from the network entity, a CC/BWP configuration message that includes CC/BWP group configuration information that identifies a CC/BWP group configuration for the at least one CC/BWP group;
configuring, by the UE, one or more communication parameters for each CC/BWP in the at least one CC/BWP group according to the CC/BWP group configuration; and
communicating, by the UE with the network entity, on at least one CC/BWP of the at least one CC/BWP group based on the one or more communication parameters configured according to the CC/BWP group configuration.

30. A method of communication, comprising:
receiving, by a network entity from a user equipment (UE), a component carrier/bandwidth portion (CC/BWP) grouping capability message that indicates a capability of the UE to support CC/BWP group-based signaling;
transmitting, by the network entity to the UE, a CC/BWP grouping indication that identifies at least one CC/BWP group based on the CC/BWP grouping capability message;
transmitting, by the network entity to the UE, a CC/BWP configuration message that includes CC/BWP group configuration information that identifies a CC/BWP group configuration for the at least one CC/BWP group; and
communicating, by the network entity with the UE, on at least one CC/BWP of the at least one CC/BWP group based on one or more communication parameters configured according to the CC/BWP group configuration.

* * * * *